J. P. B. FISKE.
PROCESS FOR HANDLING CLAY PRODUCTS.
APPLICATION FILED OCT. 29, 1917.
1,352,947.
Patented Sept. 14, 1920.
2 SHEETS—SHEET 2.
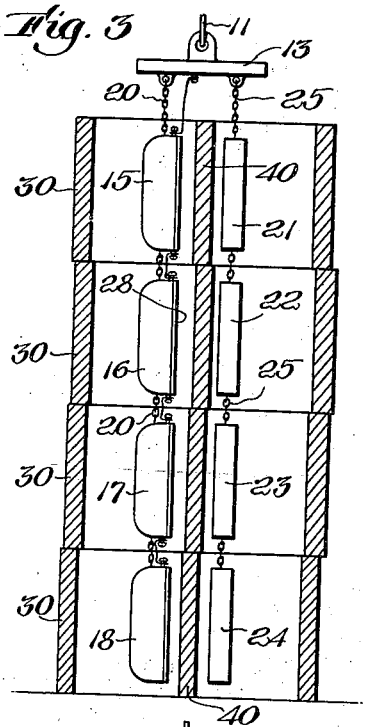
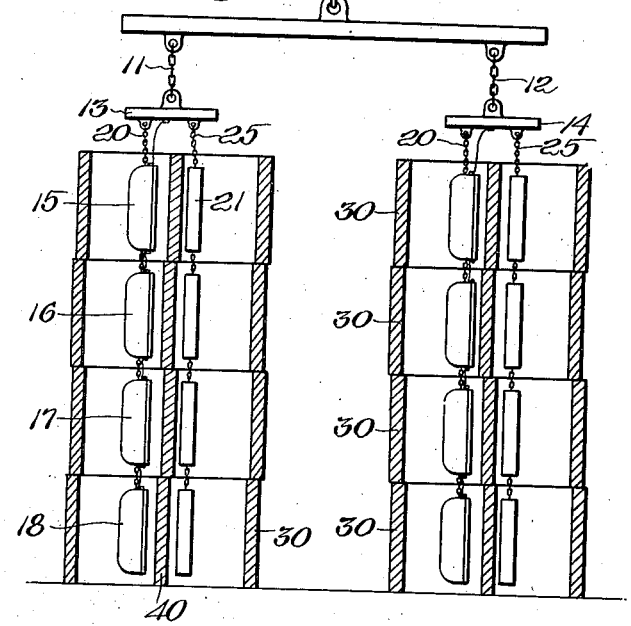
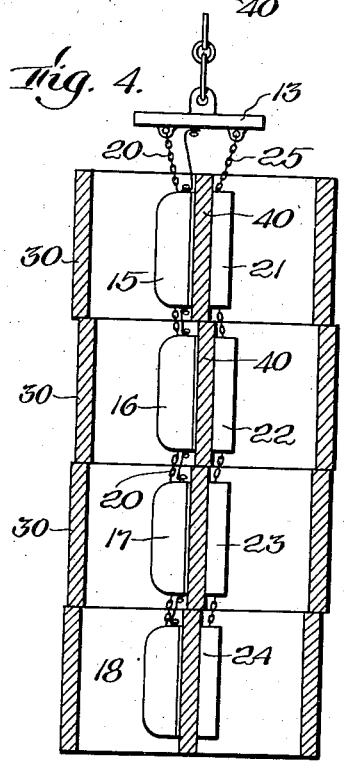
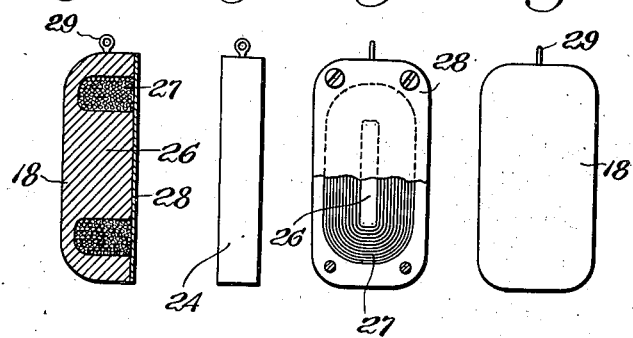
Inventor:
Jonathan P. B. Fiske,
by James R. Hodder.
Attorney.

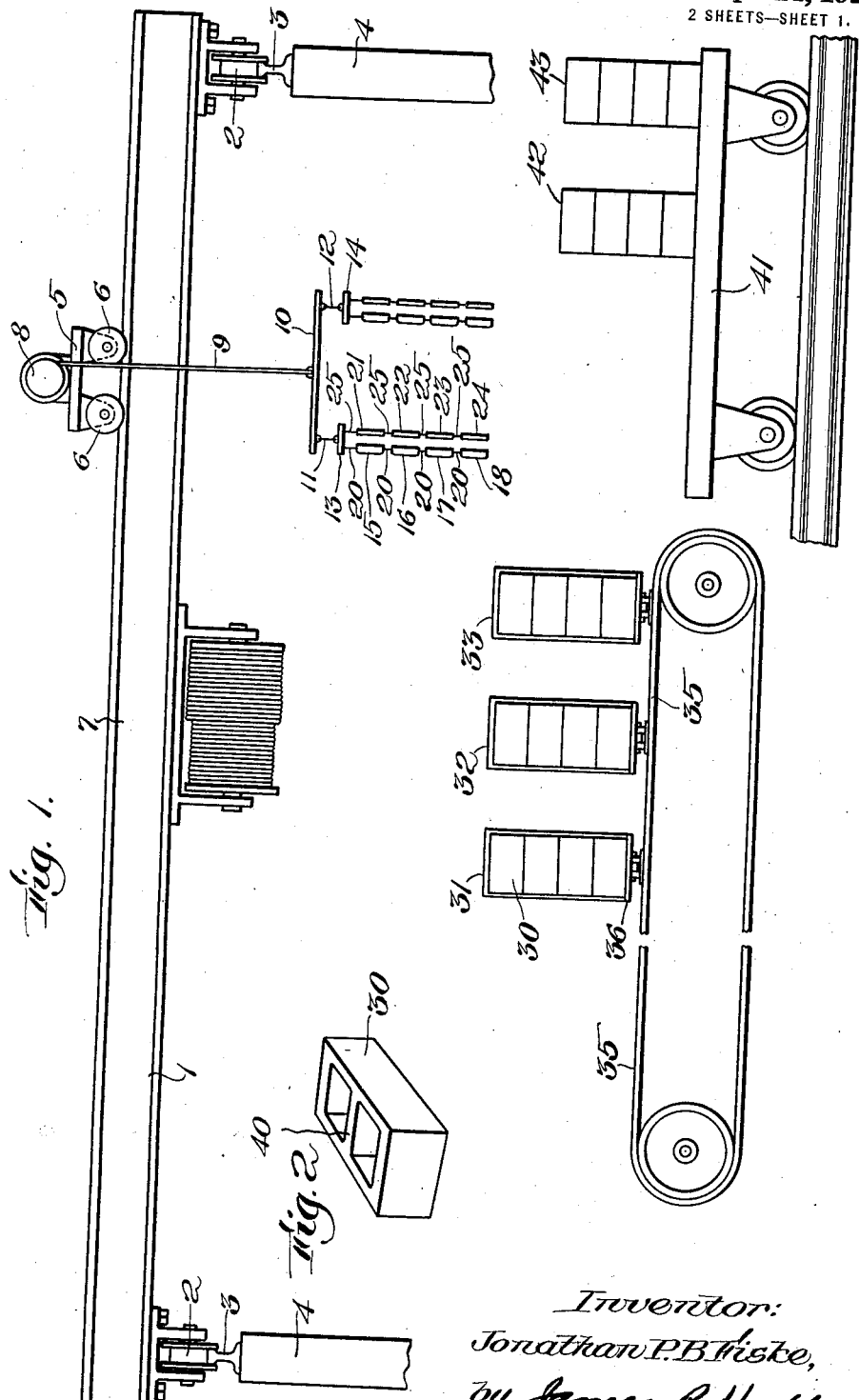

UNITED STATES PATENT OFFICE.

JONATHAN P. B. FISKE, OF NEWTON, MASSACHUSETTS.

PROCESS FOR HANDLING CLAY PRODUCTS.

1,352,947.  Specification of Letters Patent.  Patented Sept. 14, 1920.

Application filed October 29, 1917. Serial No. 198,992.

*To all whom it may concern:*

Be it known that I, JONATHAN PARKER B. FISKE, a citizen of the United States, and resident of Newton, in the county of Middlesex and State of Massachusetts, have invented an Improvement in Processes for Handling Clay Products, of which the following description, in connection with the accompanying drawings, is a specification, like letters on the drawings representing like parts.

The present invention relates to the automatic handling of clay products, particularly brick, tile, hollow clay articles, and the like, and in my development of automatic unit handling devices, I have discovered the novel method and apparatus of handling clay articles in stacked units by means of a novel type of clamping device, and by the process to be described.

My present application is directed to cover my novel handling process, wherein the brick or tile are automatically stacked in a novel manner into units. In carrying out the process, also, I prefer to utilize my novel method of electrical clamp shown and described in my copending application Ser. No. 199,442, filed October 31, 1917, although it will be appreciated that the fundamental idea of the present improved process is not limited to using either the apparatus or electrical clamp of my said applications, within the scope of certain of the broader claims herein.

In the manufacture of clay articles, such for example, as that of hollow brick or tile, which will be used for illustrative purposes herein, it is customary to make the same either on a die machine of well known type, or by presses. The more economical and expeditious manner is by means of the usual die machine which forces a stream of clay material outwardly upon an off-carrying belt and the stream is cut into individual lengths. In either instance, the clay article as first made is in an individual unit and heretofore it has been necessary to handle such units individually, and usually manually, operators picking up the same and piling them on trucks, wheelbarrows or pallets for transportation to the drier, kiln, etc.

Such stacking or piling as heretofore practised, has also been carried out, either indiscriminately, without special regard to the position of the article, or only with regard to the laying or hacking of the clay article for drying and burning, or in moving an entire piled mass through lifting apparatus engaging the bottom row of a pile of such articles.

My present process contemplates the special stacking of such clay articles vertically, either by hand or automatically, and then the subsequent handling of such vertically positioned stack by means of an overhead clamp which may be lowered into position engaging the pile of clay articles thus vertically stacked, to receive such overhead clamp, and carrying and transporting same to trucks, transportation devices, or other positions. An important and fundamental distinction between my present process of thus handling clay products in stacked units from overhead clamps, is distinguished from prior apparatus for handling a stacked pile of clay articles, because such prior devices could only lift a mass or pile of clay articles by first specially building the pile upon foundation supports or brick rows, leaving spaces underneath for the sliding of lifting bars, fingers or members. Such prior devices, of course, precluded the lifting of a pile of clay articles from the delivery belt, for example. They also necessitated careful manipulation in positioning a carrier about a pile, furthermore such old apparatus required manual piling and handling of the clay articles into the position and stack to be lifted.

I contemplate the use of automatic devices to first pile a predetermined number of clay articles into vertical position, suitable for the carrying out of my process, but the process itself may be advantageously practised, irrespective of how the vertical pile is first made, either by hand or otherwise. In illustrating and describing the process in the present application, therefore, I will start with a plurality of clay articles—such as hollow tile—in a vertical pile ready for the lowering of an overhead clamp directly thereon or therein, lifting the clay articles thus piled, or indeed, lifting a plurality of such vertical piles, and handling the same entirely from an overhead position, removing all the pile as well as the bottommost one of the pile by means of a clamping engagement on each article. A further important feature of my present process as distinguished over the prior stack lifting apparatus, is that in such old devices, so far as I am aware, the entire load of the pile was carried on the lowermost or foundation course of the clay articles. Where a pile of plastic brick or tile was thus prepared just as the same were taken from the machine, the lowermost course was apt to be distorted by the weight of the superimposed mass of clay material, as well as by the lifting bars or clamps slid underneath the lower course of the pile and brought upwardly against their bottom faces during the lifting action. My process and the apparatus for carrying out the same, contemplate the provision of an individual clamping and lifting action upon each clay article in the vertical pile. This is a distinct novelty in automatic lifting devices, and I wish to claim the same broadly. The advantage of such an individual clamping action on each clay member will be appreciated, as a relatively slight clamping action is sufficient to lift the weight of such a clay article as a hollow brick or tile without the application of enough force to distort the plastic article as soon as it is formed into individual members, and before drying.

In carrying out this process I prefer to utilize an overhead clamp, preferably of the electrical type, which will be lowered onto the vertical pile, or onto a plurality of such vertical piles of the articles, clamping a suitable part thereof, and then lifting the same, carrying it to a different position and releasing it. An important advantage of my apparatus consists in the capability with which the overhead lifting member may be arranged to coöperate in movement and position, with the travel of the off-bearing belt from a clay making machine, on which belt the plurality of clay articles may be piled in suitable vertical units and engaged by and lifted from said belt during the continuous travel, of the belt and of the clay articles, without interruption, thus forming a continuous and automatic step in the manufacturing, stacking and lifting of the clay articles during the process of their manufacture.

Referring to the drawings, illustrating a preferred apparatus to carry out this process, Figure 1 is a fragmentary view of an overhead crane, electrical clamp, and a plurality of stacked units in position at an off-bearing belt, together with a truck to which the stacked units are to be transferred for subsequent drying or kiln burning;

Fig. 2 is a perspective view of a typical type of hollow clay article for which my process is especially adaptable;

Fig. 3 is an enlarged view of the clamp when lowered in position upon a vertical pile of clay articles;

Fig. 4 is a view partly in cross section of the clamp engaging said vertical pile;

Fig. 5 is a view partly in cross section of a clamp having a plurality of clamping members adapted to engage and lift simultaneously a plurality of vertically stacked units;

Figs. 6, 7, 8 and 9 are detail views of the clamp.

I have illustrated in Fig. 1, in conventional form, a traveling crane 1, suitable for installation in a brick making establishment, said crane being fitted with usual wheels, 2, 2, adapted to travel on rails 3, 3, on supports 4, 4 together with suitable driving mechanism (not shown). The crane 1 may carry a car 5, having pairs of wheels 6, 6, adapted for movement lengthwise of the crane 1 on tracks 7. The car 5 carries suitable means 8 to wind up and lower a flexible support 9, carrying the clamp. As herein shown, where a plurality of stack engaging clamps are illustrated, I attach to the flexible support, chain, rope or the like 9, a member 10 from which is suspended by links 11 and 12, the clamp-carrying rods 13 and 14 respectively. Each clamp rod has depending therefrom a plurality of magnets 15, 16, 17 and 18 (four herein being shown). Each magnet is flexibly connected by chains or links 20, 20. Opposite each magnet in relatively similar position and adapted to coöperate therewith, is suspended from the clamp rod 13, metallic keepers 21, 22, 23 and 24, being respectively in position with the corresponding magnets 15, 16, 17 and 18. Flexible connections 25, 25, unite these keepers similar to those 20, uniting and suspending the magnets. Each magnet (see Figs. 6 and 8) is preferably made with a core 26, around which are the current receiving wires 27, and is covered by a plate 28 to prevent injury to the wires during the clamping action. Screw eyes 29 are positioned where required to engage the flexible links connecting and sustaining each magnet.

A plurality of brick 30 are positioned in vertical stacked units, as indicted at 31, 32 and 33, traveling continuously on an off-bearing belt 35. These stacked units 31, 32 and 33 may be carried on supports 36, as described in my said copending application. A suitable electrical source of power (not shown), with flexible connections through the car 5 and clamping magnets, is provided. Automatic means are preferably provided to move the car 5 into position over a series of stacked units 31, 32 and 33, then arranged to travel therewith at the same rate of speed as that of the off-bearing belt 35. In this position the apparatus is actuated to lower the flexible support 9 so that the clamping magnets and their coöperating keepers will be lowered downwardly through the vertical stacked units, with said magnets and keepers spaced sufficiently to freely encompass an interior web 40 of the hollow brick 30, here shown as the middle web. The power is then thrown onto the magnets, 13 sufficient to cause both magnets and keepers to clamp the web 40 of each clay article in each vertical stack with a sufficient force to lift the same, whereupon the entire clamp is lifted by winding up the member 9 and the clay articles are thus removed from the belt 35 and deposited on the car 41 as shown at 42 and 43, or to other desired position. It will be appreciated that a large number of such clamping members may be manipulated simultaneously to engage, lift and carry a sufficiently large number of the stacked units to insure ample time for the unloading of the units on the car 41 and the return of the traveling car 5 and its clamps to engage the next plurality of stacked members coming in line on the off-bearing belt 35, the return travel of the car 5 being much speedier than that of its forward travel, which must correspond to that of the belt 35.

I believe that my novel process of lifting clay articles in this manner, and of piling such clay articles in a vertical position to be lifted, from above, as distinguished from engaged underneath, is distinctly new. I also consider that the handling of hollow clay articles by engagement of any suitable part thereof, preferably of an interior web or member is distinctly novel, and an important feature.

My invention is further described and defined in the form of claims as follows:

1. That improvement in the art of manufacturing hollow clay articles, which consists in first piling a plurality of said articles into a vertical column with the air spaces substantially in vertical alinement, lowering a pair of clamping devices adapted to be electrically energized through adjacent vertical air spaces in the column of clay articles, said pair of electrical clamping devices being positioned on each side of an inner web in said clay articles, then supplying electrical energy to said clamping devices, whereby the pair of devices will clamp automatically on opposite sides of said inner web of each article in the column and then lifting the clamping devices and said column of articles while the clamps are energized.

2. The improved process of handling hollow clay articles having an inner web adjacent air spaces, which consists in providing a pair of electrical clamping devices, one device comprising a magnet and the coöperating member a keeper, piling a plurality of said articles into a plurality of columns with the webs and air spaces of each article substantially in alinement, then positioning a plurality of said electrical clamping members arranged with separate members for each article in each column, lowering the clamping devices while normally separated and deënergized, energizing said magnets when a magnet and keeper are positioned to engage each article in each column and then lifting the plurality of columns of articles while the magnets are so energized, transporting the same, lowering the column, deënergizing the magnets and releasing the articles.

In testimony whereof, I have signed my name to this specification, in the presence of two subscribing witnesses.

JONATHAN P. B. FISKE.

Witnesses:
  JAMES R. HODDER,
  HAROLD J. CLARK.